United States Patent
Zenzerovich et al.

(10) Patent No.: US 6,311,848 B1
(45) Date of Patent: Nov. 6, 2001

(54) ACTUATOR DEVICE FOR TILT EJECTORS OF FRUIT FORMING PART OF AN ARRANGEMENT FOR CLASSIFICATION OF FRUIT

(76) Inventors: Fernando Juan Zenzerovich; Alberto Martin Zenzerovich, both of Ruta 25 a 1, 6 km, Panamericana hacia Matheu, Belén de Escobar, Buenos Aires (AR)

( * ) Notice: Subject to any disclaimer, the term of this patent is extended or adjusted under 35 U.S.C. 154(b) by 0 days.

(21) Appl. No.: 09/438,800

(22) Filed: Nov. 12, 1999

(30) Foreign Application Priority Data

Nov. 18, 1998 (AR) .......................... P98 01 05834

(51) Int. Cl.$^7$ .................................................. B65G 47/40
(52) U.S. Cl. ...................... 209/648; 209/655; 209/515; 209/651; 209/912; 209/916; 198/370.01; 198/370.04
(58) Field of Search ................................... 209/655, 648, 209/515, 647, 646, 651, 653, 912, 916; 198/370.01, 370.04

(56) References Cited

U.S. PATENT DOCUMENTS

| | | | |
|---|---|---|---|
| 3,918,587 | * | 11/1975 | Drew, Jr. ............................. 209/593 |
| 4,989,719 | * | 2/1991 | Ballestrazzi et al. ................ 198/365 |
| 5,611,419 | * | 3/1997 | LaVars ............................. 198/370.04 |
| 5,664,660 | * | 9/1997 | Prydtz et al. .................... 198/370.04 |
| 5,667,054 | * | 9/1997 | Goor ................................ 198/370.04 |
| 5,947,361 | * | 9/1999 | Berger et al. .......................... 226/92 |
| 6,158,568 | * | 12/2000 | Erceg et al. .................... 198/370.04 |

* cited by examiner

Primary Examiner—Donald P. Walsh
Assistant Examiner—Jonathan R. Miller
(74) Attorney, Agent, or Firm—Notaro & Michalos P.C.

(57) ABSTRACT

A device for tiltable ejectors of fruit in conveyor carts integrated into electronic classifiers has a lifting-ejector formed by a bent and supported vertical shaft which turns freely by its upper end section and is operationally connected to the tiltable ejector. Its lower end section is parallel to the supported upper part and serves to pass along an axis of advance, first in relation to a fixed rectilinear deflector, followed within an angularly displaceable deflector under electronic control and finally above an actuating ramp. The angularly displaceable deflector has a position of rest in which, together with the fixed deflector, it determines the trajectory of non-actuation of the lifting-ejector. Another position directs it toward a ramp and determines its trajectory of actuation to secure tilting of the ejector and the fruit carried thereby.

7 Claims, 3 Drawing Sheets

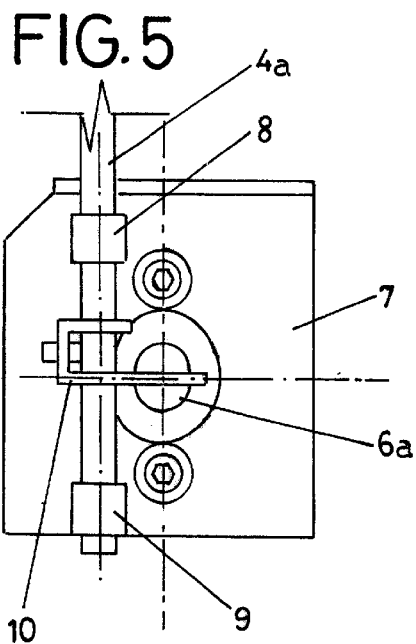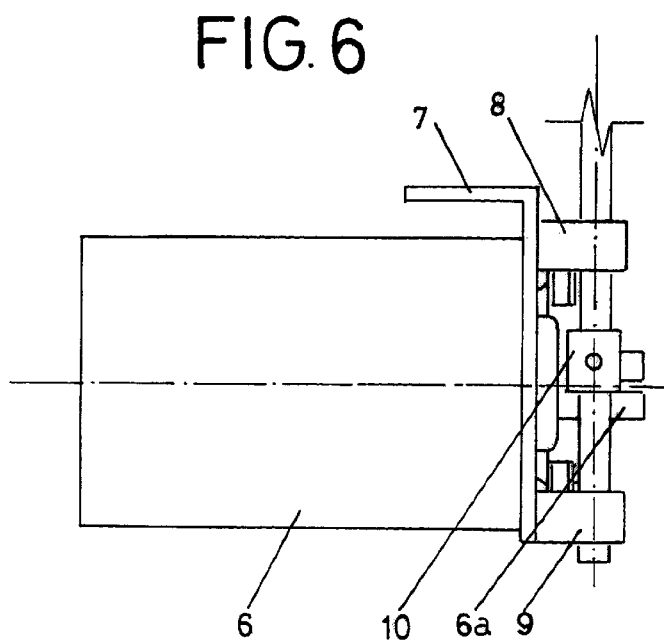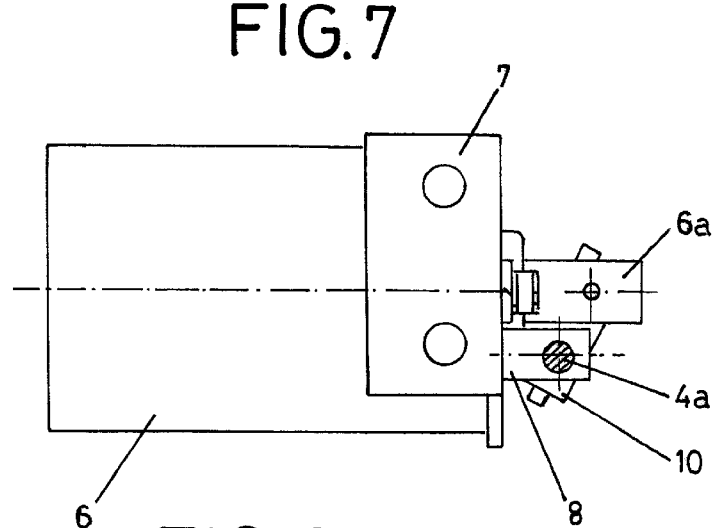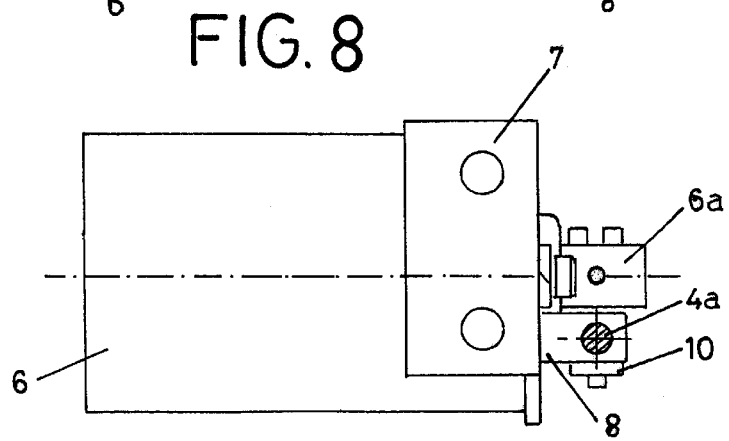

ACTUATOR DEVICE FOR TILT EJECTORS OF FRUIT FORMING PART OF AN ARRANGEMENT FOR CLASSIFICATION OF FRUIT

FIELD AND BACKGROUND OF THE INVENTION

The present invention refers to an actuating device for tiltable ejectors of fruit or the like provided as a unit in conveyor carts integrated into electronic classifiers.

Up to the present, these types of ejectors have been known to be actuated by a respectively lifting-ejector formed by a guided vertical shaft. The shaft is moved upwardly by a solenoid and controls, by pushing, the angular movement of the corresponding ejector member. The member is articulated on the cart, and consequently the overturning of the fruit, supported and retained elastically over said member, occurs toward a collection medium.

SUMMARY OF THE INVENTION

The inventive device includes in combination a lifting-ejector formed by a vertical shaft displaceable upwardly under control but resting and freely turnable. A fixed rectilinear deflector is the object responsible for locating the lifting-ejector in a position of non-actuation. An angularly displaceable deflector on one turnable shaft is rotatable by a control solenoid and an intermediate arm for directing the lifting-ejector toward an actuation ramp. This actuation ramp is comprised of a grooved member able to guide and push upwardly the lifting-ejector deflected so that in turn it pushes the ejector member provided in the conveyor cart and produces the overturning of the fruit supported on said ejector member.

With this device used during displacement of the conveyor cart, the lifting-ejector remains unactuated until the movable deflector moves. Movement is at a predetermined time which is set by the electronic computer of the classifier through the solenoid and the arm, so that it may proceed to direct it toward the actuation ramp where it is compelled by the same to move upwardly to produce, by pushing, the overturning of the ejector and consequently the fall of the fruit carried by the same toward means of collection the fruit.

Comparatively the advantages of the invented device have to do with the possibility of being able to vary the angle of the actuation ramp for purposes of producing the smoothest overturning of each type and variety of fruit. The invention also has a high frequency of use appropriately due to the small effort required by the movable deflector to turn the lifting-ejector due to the fact that the overturning force is produced by the actuation ramp.

For its structural details and to anticipate its true inventive scope, it may be said that it is characterized by including a lifting-ejector whose formative vertical shaft is supported and freely turnable, over the classifier bench. A lower end section of the shaft is parallel to its upper end section and with respect to the axis or direction of advance of the lifting-ejector. A fixed rectilinear deflector is followed by an angularly displaceable rectilinear deflector of the ejector and in turn is followed by a localized actuation ramp in the axis or direction of advance for the fruit. The movable deflector has a position at rest in which together with the fixed deflector, it determines the trajectory of non-actuation of said lifting-ejector. Another position toward the actuation ramp, determines the trajectory of actuation of the same lifting-ejector.

BRIEF DESCRIPTION OF THE DRAWINGS

For the purpose of the present invention being better and more clearly understood, it will be described below with reference to a practical example which has been illustrated in the accompanying drawings in which, schematically:

FIG. 5 is a detailed view in front elevation of the control applied to the angularly displaceable deflector and in this case formed by a solenoid and an intermediate arm;

FIG. 6 is a detailed view of said solenoid and intermediate arm seen in a side elevation;

FIG. 7 is a plan view of both in idle position; and

FIG. 8 is also a plan view of both in operating position.

DESCRIPTION OF THE PREFERRED EMBODIMENTS

Figure 1:
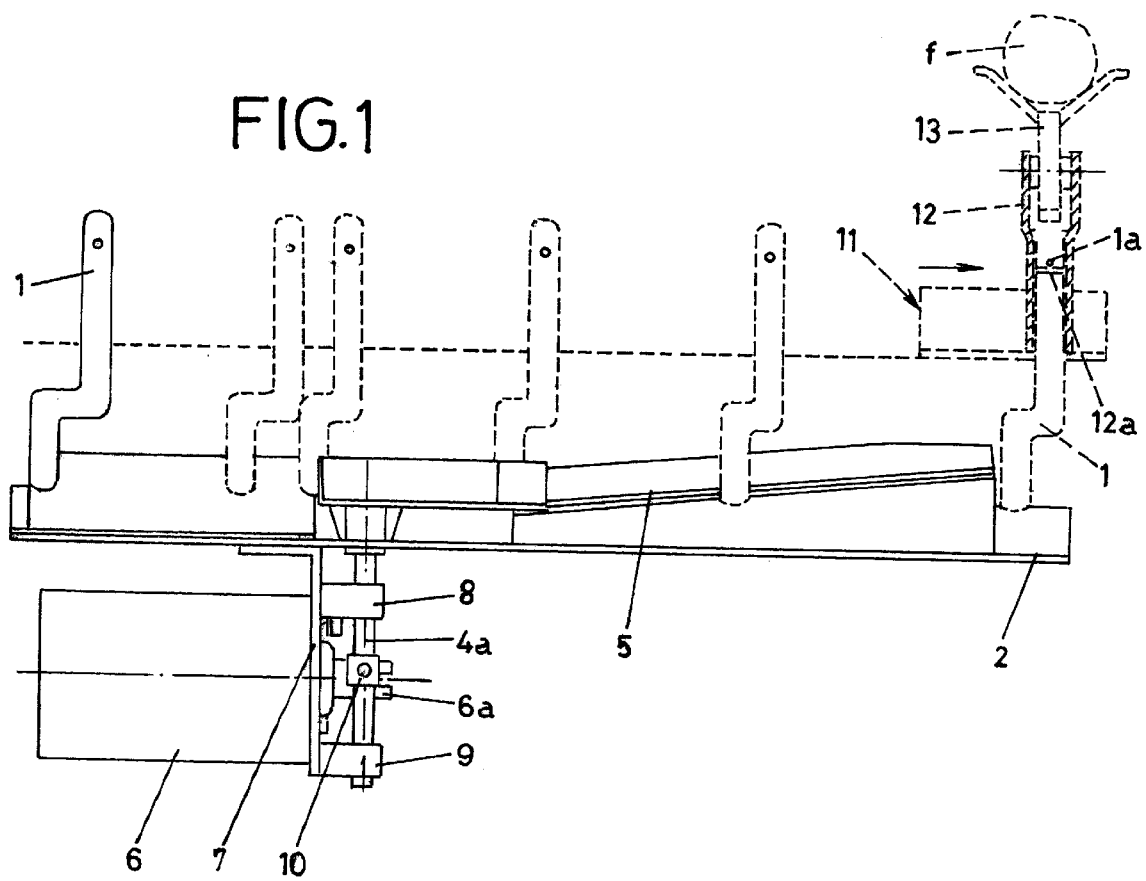
FIG. 1 is a view which in lateral elevation illustrates the invented device with its lifting-ejector being a part of its trajectory of non-actuation, and for better clarity only the last part of the same related to the support of the ejector is shown and therefore at the conveyor cart to which said ejector belongs.
Figure 2:
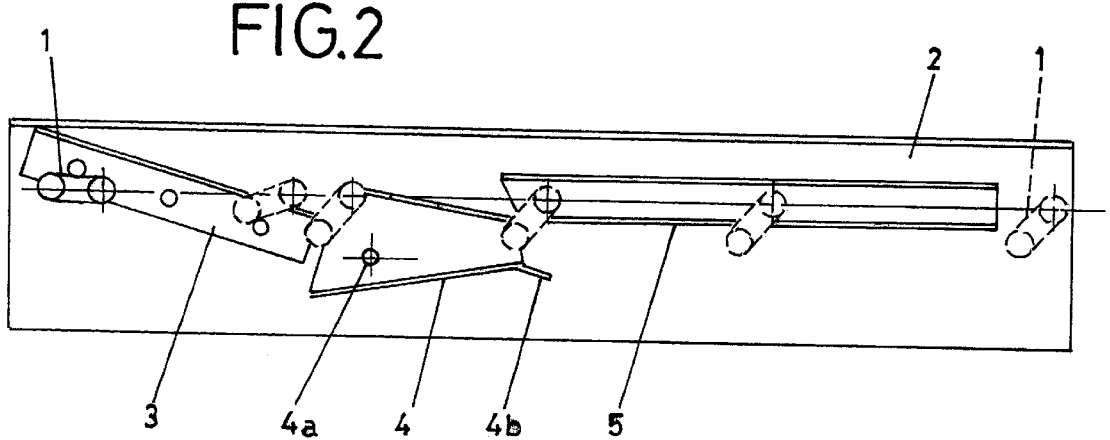
FIG. 2 is the plan view of FIG. 1 without said conveyor cart.

In the figures the same reference designations indicate the same or analogous parts.

In accordance therewith, the invented actuating device for the purposes specified includes a lifting-ejector 1 formed by a supported vertical shaft, that is supported to be freely rotatable and for rising and falling motion in a conveyor cart of the fruit classifier. The ejector is movable in relation to a tiltable ejector member which is to be actuated to produce overturning motion of the fruit carried by the cart. The fruit is overturned in a bench of the classifier on a base 2 and in connection with a lower end section of said lifting-ejector 1. The fruit also moves with respect to the axis of advance of the conveyor cart, a fixed rectilinear deflector 3, an angularly displaceable deflector 4 and an actuation ramp 5.

The fixed rectilinear deflector 3 is "L" shaped with its vertical flank acting as a deflector proper and its the other leg being attached to the base 2. The angularly displaceable deflector 4 is mounted on a corresponding turning shaft 4a and is "U" shaped with its two flanks respectively integrating deflectors of the lifting-ejector 1 toward positions of non-actuation and actuation. One of the ejectors 1 in its actuation position abuts deflector 4 at its angular displacement and the actuation ramp 5 which in turn is of grooved cross section for the purpose of guiding the ejector toward its position of actuation.

The angularly displaceable deflector 4 is moved by a solenoid 6 which has a front support plate 7 in which the vertical turning shaft 4a of the deflector passes through a pair of bearings 8 and 9 and is joined to a forked end section of a core of solenoid 6 by means of an arm 10.

Figure 3:
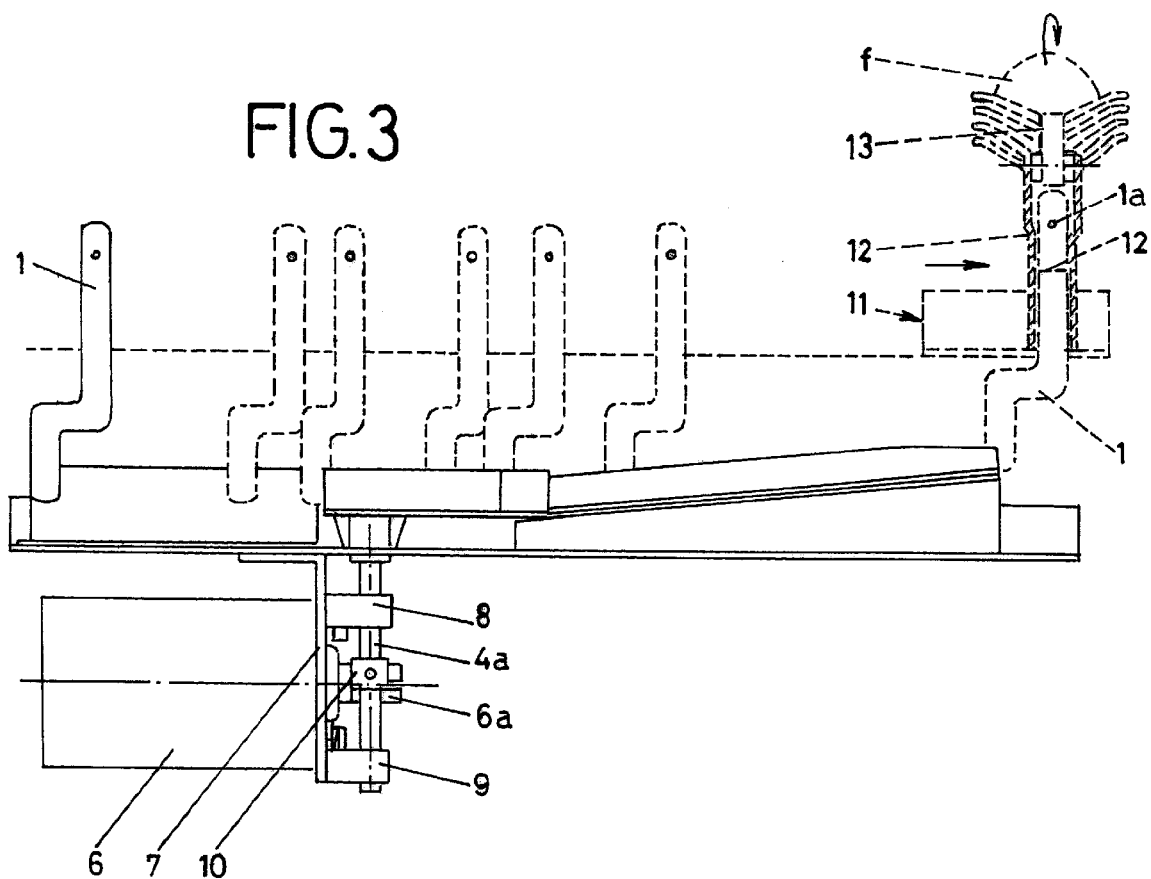
FIG. 3 is a view similar to FIG. 1 but with said lifting ejector in its trajectory of actuation.
Figure 4:
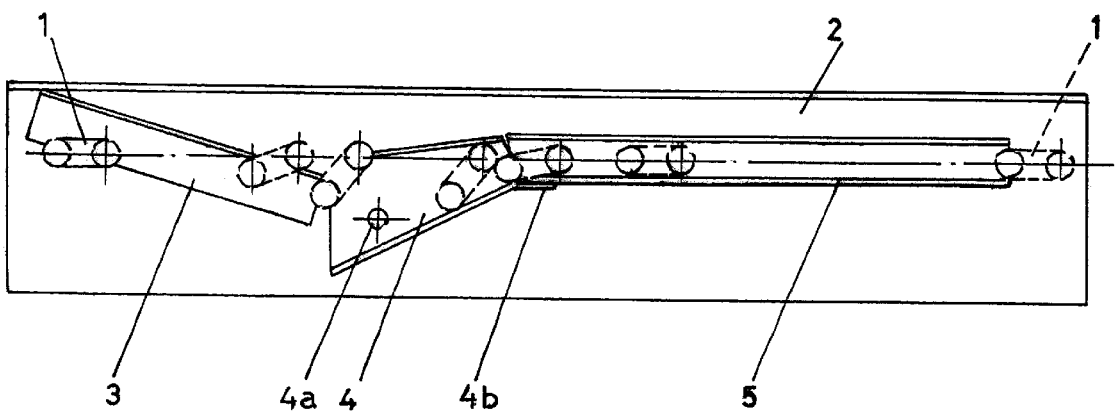
FIG. 4 is a plan view of FIG. 3 without the conveyor cart.

The device thus formed lends itself to be applied for example to a conveyor cart 11 illustrated schematically in FIGS. 1 and 3.

In this conveyor cart 11 there are distinguished a vertical support guide 12 for the lifting-ejector 1 and a tiltable ejector 13 above the lifting-ejector 1 in the same vertical support guide 12.

During displacement of the conveyor cart, with the fruit to be classified f arranged over its tiltable ejector 13, the lifting-ejector 1 remains idle and by means of its pin 1*a* over a support 12*a* provided in the support guide 12. Also, in the position of non-actuation which, during the displacement of the conveyor cart 11, is imposed on the ejector 1, the fixed rectilinear deflector 3 acts against its lower end section such that it can freely cross the angularly displaceable deflector 4 and pass outside of the actuation ramp 5.

Up to the time at which an electronic computer of the device outputs a command to move to the angularly displaceable deflector 4 and, upon doing such, determines the direction of the lifting-ejector 1 toward the actuation ramp 5 and in an obvious way produces the movement of ascent and as a result of the same the pushing of the ejector and the consequent tilting of the ejector 13 and of the fruit f toward a means of collection.

What is claimed is:

1. An actuating device for tiltable ejectors of fruit that are provided as a unit in a conveyor cart integrated into an electronic classifier of a type which has a guided and supported lifting-ejector, and formed by a vertical shaft operatively incident against a corresponding tiltable ejector, the device comprising: a lifting-ejector having a formative vertical shaft which is supported and freely turnable over a bench of the classifier in association with a lower end section of said shaft which is parallel to an upper end section of said shaft and with respect to a direction of advance of the lifting-ejector; a fixed rectilinear deflector followed by an angularly displaceable and controllable rectilinear moveable deflector and by a localized actuation ramp in the direction of advance; said moveable deflector having an idle position in which jointly with the fixed deflector the movable deflector determines a trajectory of non-actuation of said lifting-ejector; and said moveable deflector having another position adjacent the actuation ramp for determining a trajectory of actuation of said lifting-ejector.

2. An actuating device of claim 1, wherein said fixed rectilinear deflector is of perpendicularly angular cross section.

3. An actuating device of claim 1, wherein said fixed rectilinear deflector is of "L" cross section.

4. An actuating device of claim 1, wherein said angularly displaceable rectilinear deflector is of "U" cross section.

5. An actuating device of claim 1, wherein said movable deflector includes a turning shaft under the bench of the classifier which is guided in a pair of pins, and a control solenoid operatively connected to the pins for rotating said turning shaft and for moving said movable deflector.

6. An actuating device of claim 1, wherein said movable deflector has an end abutting the actuation ramp.

7. An actuating device of claim 1, wherein said actuation ramp is grooved.

\* \* \* \* \*